US006578092B1

(12) United States Patent
Lau et al.

(10) Patent No.: US 6,578,092 B1
(45) Date of Patent: Jun. 10, 2003

(54) FIFO BUFFERS RECEIVING DATA FROM DIFFERENT SERIAL LINKS AND REMOVING UNIT OF DATA FROM EACH BUFFER BASED ON PREVIOUS CALCUATIONS ACCOUNTING FOR TRACE LENGTH DIFFERENCES

(75) Inventors: O. Daryn Lau, Saratoga, CA (US); Frank Chui, Sunnyvale, CA (US); Gene Chui, Campbell, CA (US); Gary Kipnis, Sunnyvale, CA (US); Gurmobau Samrao, San Jose, CA (US); Neil King, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/295,680

(22) Filed: Apr. 21, 1999

(51) Int. Cl.[7] .......................... G06F 13/00; G06F 15/76
(52) U.S. Cl. ............................ 710/29; 710/33; 710/52; 710/53; 710/131; 370/401; 370/419; 370/428; 370/429

(58) Field of Search ............................. 710/33, 52, 53, 710/29, 131; 370/401, 428, 429, 419

(56) References Cited

U.S. PATENT DOCUMENTS

| 5,701,546 | A | * | 12/1997 | Shimomura et al. | ........... 710/29 |
| 5,724,602 | A | * | 3/1998 | Tanaka et al. | ................ 712/32 |
| 6,070,129 | A | * | 5/2000 | Grouffal et al. | .............. 702/32 |

* cited by examiner

Primary Examiner—Jeffrey Gaffin
Assistant Examiner—Tammara Peyton
(74) Attorney, Agent, or Firm—Blakely, Sokoloff, Taylor & Zafman LLP (57) ABSTRACT

A communication interface is described to align at a destination data transmitted through different channels before that data is read out. The communication interface includes a receiver circuit that has a plurality of buffers. Each buffer is coupled to a corresponding channel to receive data therethrough. The communication interface also includes a control circuit, coupled to the plurality of buffers, to enable reading of data from the plurality of buffers when each of the plurality of buffers has received at least one unit of data.

43 Claims, 8 Drawing Sheets

FIFO BUFFERS RECEIVING DATA FROM DIFFERENT SERIAL LINKS AND REMOVING UNIT OF DATA FROM EACH BUFFER BASED ON PREVIOUS CALCUATIONS ACCOUNTING FOR TRACE LENGTH DIFFERENCES

BACKGROUND OF THE INVENTION (1) Field of the Invention

The present invention generally relates to the field of communication networks. More particularly the present invention relates to alignment of data in communications networks.

(2) Background

Figure 1:
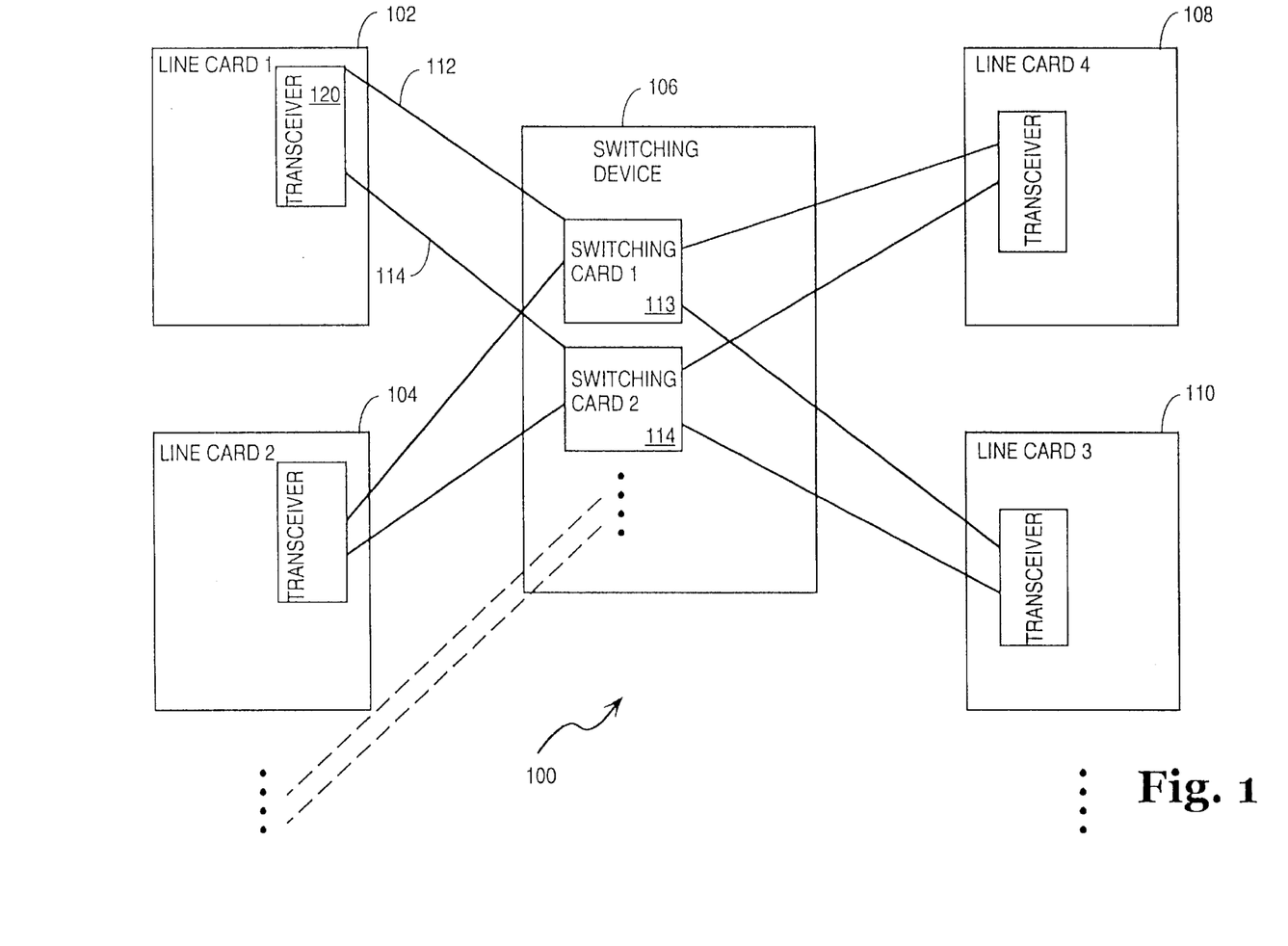
FIG. 1 illustrates in simplified form a portion of communication network.

Communication networks typically use communication interfaces (hereinafter referred to as "line cards") to transmit/receive data to/from communication lines. Data may also be transmitted from ingress line cards via serial links to egress line cards. On its way to the egress line cards, data is switched by a switch fabric. FIG. 1 illustrates a communication network 100 that includes ingress line cards 102 and 104 that communicate with egress line cards 108 and 110 via switch fabric 106 (hereinafter referred to as "switch device"). Switch device 106 includes switch planes (hereinafter referred to as "switch cards") 113 and 114 by way of which data, transmitted by ingress line cards 102 and 104, is switched to egress line cards 108 and 110.

Each ingress line card may make a request for transmitting data, via switch device 106, to an egress card. A switch card, such as switch card 113 for example, decides which request from an ingress line card may be granted, so data may be transmitted from the line card to the respective switch card. When an ingress line card that made a request to a switch card receives a grant back from the switch card, it starts transmitting data to the switch card. Data is serially transmitted by each line card in the form of units of data (hereinafter referred to as "cells") to switch device 106 through an associated transceiver, such as transceiver 120, and channels 112 and 114. For simplification, FIG. 1 illustrates two ingress line cards 102 and 104, two egress line cards 108 and 110, and two switch cards 113 and 114. However, the following discussion pertains to network systems that may include any number of line cards and switch cards.

Figure 2:
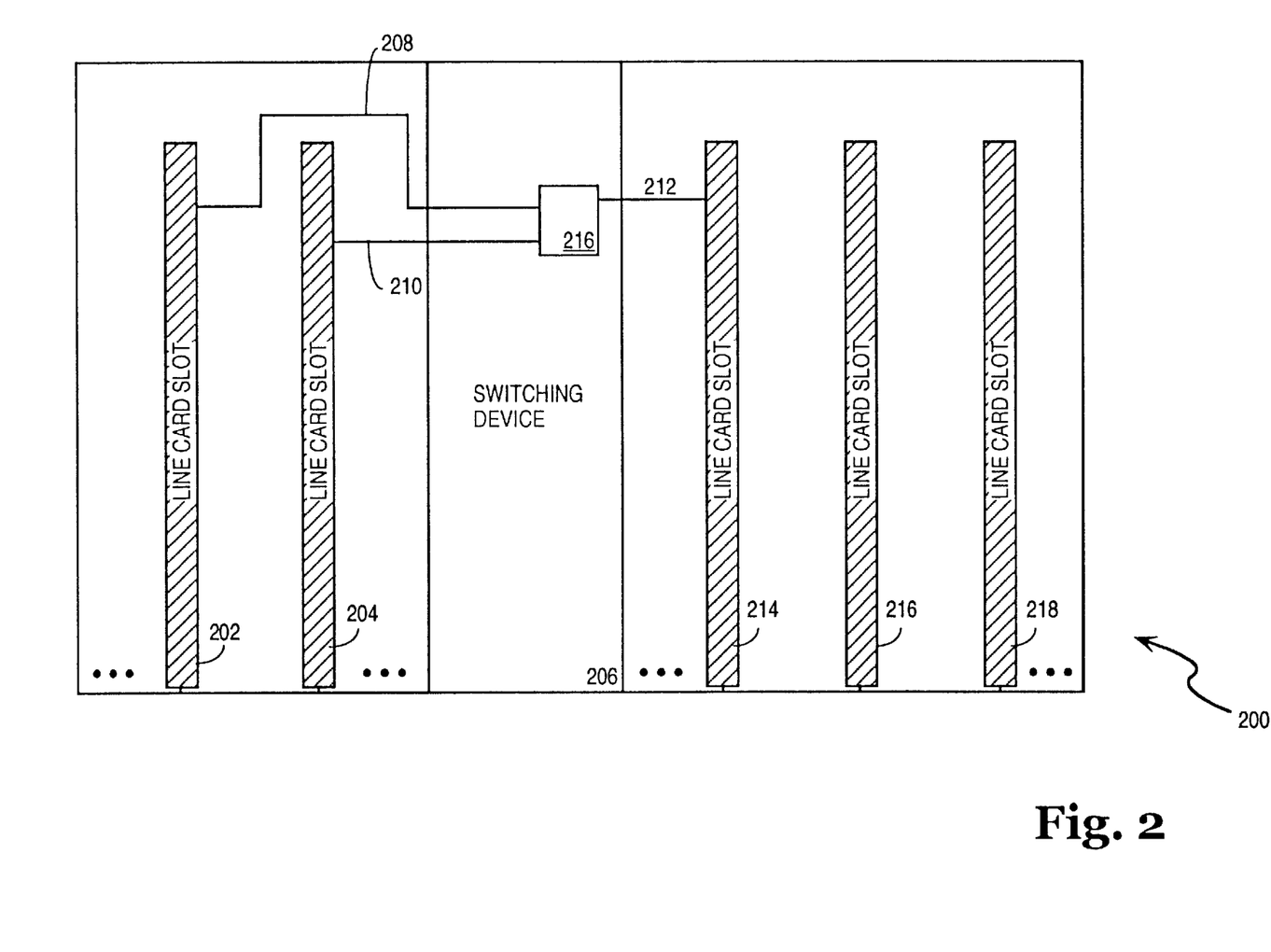
FIG. 2 illustrates a chassis for the portion a communication network system.

FIG. 2 illustrates a chassis 200 of a communication network such as the communication network described above in connection with the illustration of FIG. 1. Chassis 200 includes a switch device 206 with a switch card 216 and a plurality of line card slots 202, 204, 214, 216, and 218 that may be positioned on each side of switch device 206. Various line cards (not shown) may be plugged into the plurality of line card slots shown in the figure. Traces 208 and 210 couple the line card slots and thereby their associated line cards to switch card 216. As line cards slots 202 and 204 are located in the chassis at different positions with respect to switch device 206, the length of each trace may vary from one line card slot to another line card slot. For example, trace 210 is shorter than trace 208 as line card slot 204 is positioned closer to switch card 216 than line card slot 202. The differences in the lengths of various traces may cause problems at the destination where the cells may arrive misaligned—i.e., at substantially different bit times. Cells departing from the source aligned to a specific clock count, may arrive at the destination misaligned. Because serial data is transmitted at high frequency, within the Gigahertz (GHz) range, even the slightest differences between the lengths of various traces may cause.data flowing through these traces to arrive at the destination misalgined. However, the cells transmitted through different channels are expected to arrive at the destination at a substantially same time so that these cells may be aligned and processed at the destination at a substantially same time. The destination may either be the switch cards, when data is sent out by the line cards, or the line cards, when data is sent out by the switch cards.

Misalignment may also be caused by other factors. These factors include parallel/serial transceiver latency, such as transmit or receive latencies, temperature differences at different parts of the system, different loading for different channels, crosstalk, etc. Transceiver latency may be transmit latency (TX Latency) or receive latency (RX Latency). "TX latency" may be defined as the time that takes a cell to pass from the input of a transceiver's transmitter to the output of the transceiver's transmitter. "RX latency" may be defined as the time that takes a cell to pass from the input of the transceiver's receiver to the output of the transceiver's receiver. TX and RX latencies are mainly caused by the analog recovery circuitry of transceivers. These latencies may not be quantified by a predictable number and differ from transceiver to transceiver. Traces may also be subject to cross talk which may cause data flowing through different channels to arrive at the destination at different times. Loading may also affect the arrival time of data flowing through different channels as each trace has a different loading.

SUMMARY OF THE INVENTION

A communication interface is described to align at a destination data transmitted through different channels, before that data is read out. The communication interface includes a receiver with a plurality of buffers. Each buffer is coupled to a corresponding channel to receive data therethrough. The communication interface also includes.a control circuit coupled to the plurality of buffers. The control circuit enables a reading of data from the plurality of buffers when each of the plurality of buffers has received at least one unit of data.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A communication interface (line card) for a communication network and method are described to align at a destination data transmitted through different channels before that data is read out. For one embodiment of the present invention, the line card has a receiver that includes a plurality of buffers. Each buffer is coupled to a corresponding channel to receive data therethrough. The line card also includes a control circuit coupled to the plurality of buffers. The control circuit enables reading of data from the plurality of buffers when each of the plurality of buffers has received at least one unit (cell) of data. The control circuit ensures that before data is read from the plurality of buffers, each of the buffers of the plurality of buffers stores at least one cell of data. Therefore, data from the plurality of buffers may be aligned and then read out at a substantially same time, although that data may have arrived at the destination at different times due to the particular characteristics of each channel.

Specifically, the control circuit enables a reading of data from the plurality of buffers after lapse of a first time. The first time is calculated from a point in time when one of the plurality of buffers (hereinafter referred to as "first buffer"), that was the first to receive a first cell of data, received that first cell of data. The first time is a time lapsed between receipt of a first cell of data by the first buffer and receipt of a first cell of data by a last buffer of the plurality of buffers. The last buffer is a buffer of the plurality of buffers that was the last to receive a first cell of data destined for that buffer. The first time is a pre-calculated time value that depends on the particular characteristics of the channels through which data is transmitted to the plurality of the buffers. One of the particular characteristics is the length of traces through which data is transmitted to the buffers.

Figure 3:
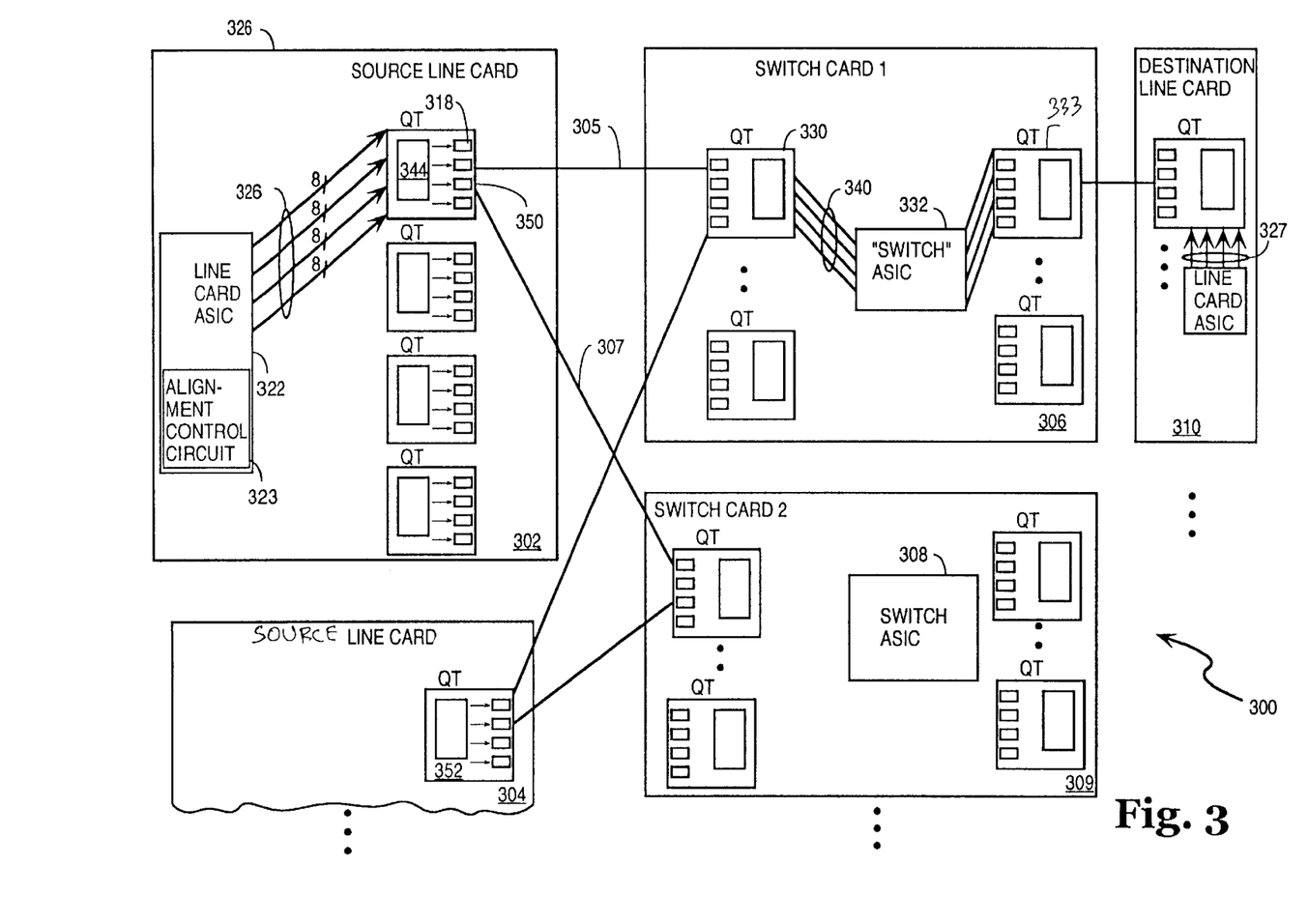
FIG. 3 is a block diagram for an embodiment of a line card of the portion of the communication network according to the present invention.

FIG. 3 is a block diagram that illustrates a portion of a communication network (hereinafter "communication network") 300 for one embodiment of the present invention. Communication network 300 includes a plurality of ingress line cards (source line cards) of which line cards 302 and 304 are shown. Moreover, communication network 300 includes a plurality of switch cards, of which switch cards 306 and 309 are shown. Furthermore, communication network 300 includes a plurality of egress line cards (destination line cards) of which line card 310 is shown. Typically, the switch cards act independently from one another and make decisions concerning which requests from line cards to accept and which data from line cards to forward to the egress line cards. Each line card is capable of sending a data stream to each of the switch cards. Each switch card accepts data from all the line cards.

A line card includes a line card control circuit 322 that performs functions including request generation and grant processing. For one embodiment, control circuit 322 includes an Application Specific Integrated Circuit (ASIC) 322. Furthermore, each line card includes a plurality of transceivers 350. For one embodiment, each line card includes four quad-transceivers 350. Nevertheless, for alternative embodiments fewer or more quad-transceivers may be used. Each quad-transceiver 350 receives from the line card control circuit 322 four sets of parallel data via four eight-bit lines 326. Quad-transceiver 350 has four ports 318. Each port has a capability of transmitting data via a line coupled to that port and of receiving data via a different line coupled to the port. Each quad-transceiver such as quad-transceiver 350 may transmit via the four ports 318 thereof four serial-bit streams to four different switch cards. The transmit and receive lines for each port constitute a channel. For the embodiment described herein each quad-transceiver may communicate via 4 channels. Therefore, each line card may communicate via 16 channels as there are four quad-transceivers per line card. Accordingly, a line card is capable of transmitting 16 serial data streams and of receiving 16 serial data streams. FIG. 3 illustrates line card source 302 with two channels 305 and 307 coupled to two different switch cards 306 and 309 respectively. For simplification purposes, not all channels of transceivers 352 and 350 have been shown in the figure.

For one embodiment, the communication network 300 has 4 switch cards of which switch cards 306 and 309 are shown in the figure. Each quad-transceiver of a switch card receives four streams of serial data from different ingress line cards and converts these streams of serial data into four streams 340 of parallel data. The four streams 340 of parallel data are sent for processing to a switch card control circuit 332 that may include a switch ASIC 332. Switch ASIC 332 sends out data streams to quad-transceiver 333, for example, in a synchronized manner. Despite this synchronized manner, cells of data transmitted out to a destination line card (egress line card) 310 via different channels may arrive at the destination line card at different times—i.e., the cells are misaligned. The misalignment problem is resolved by way of an alignment control circuit 323 placed in ASIC 322, of each line card, that cooperates with a receiver circuit 344, typically placed in each transceiver of a line card.

Figure 4:
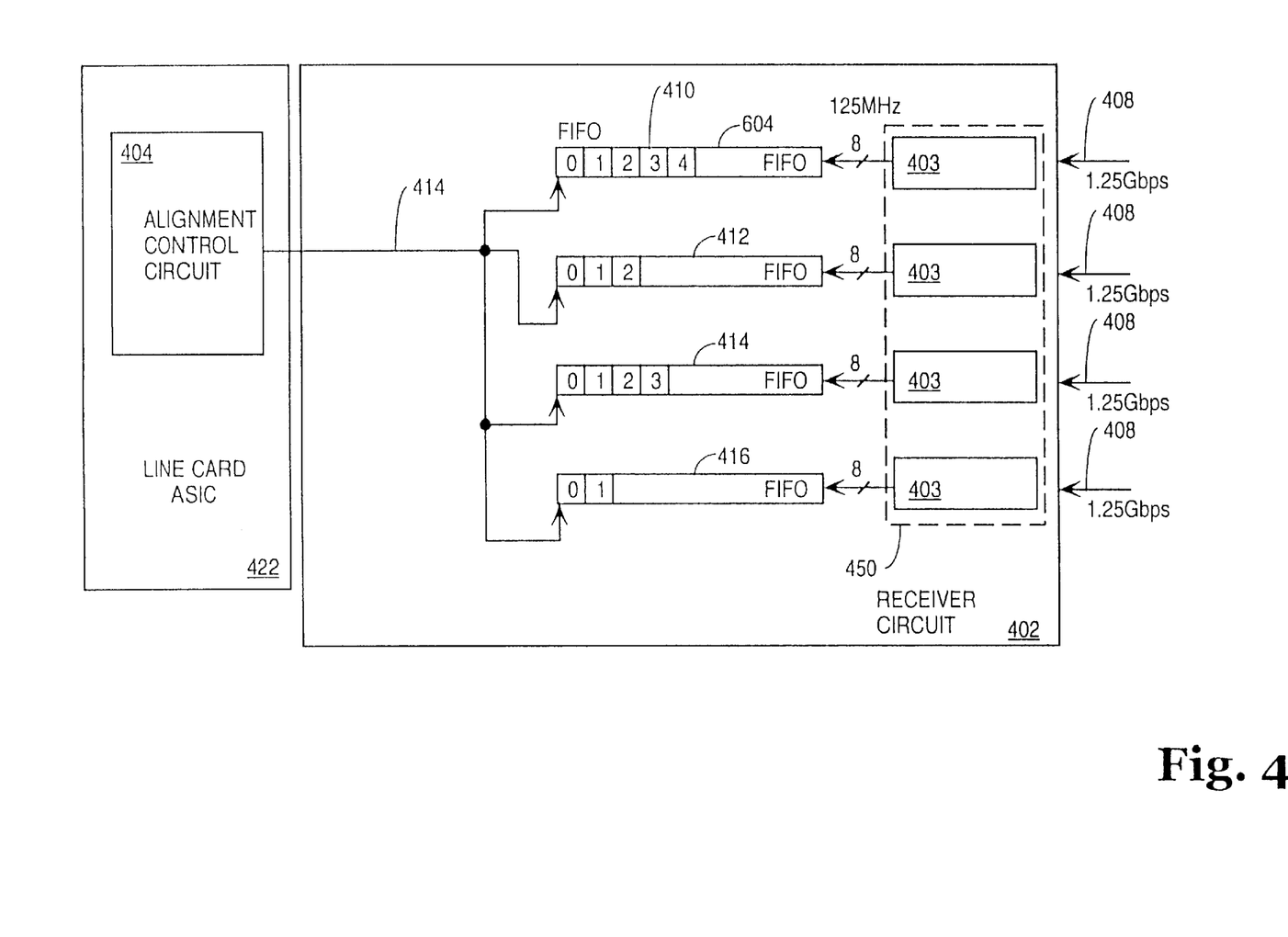
FIG. 4 illustrates a receiver circuit with a plurality of buffers coupled to an alignment control circuit for an embodiment of a line card according to the present invention.

FIG. 4 illustrates a receiver circuit 402 coupled to an alignment control circuit 404 of line card ASIC 422. Receiver circuit 402 is typically placed on a quad-transceiver of a line card. Receiver circuit 402 includes a serializer/deserializer and decode circuit 450 (shown within dotted lines). For each channel 408, circuit 450 includes a unit 403 that performs deserialization and decoding functions. Each unit 403 is coupled to a channel 408 via which cells of data are transmitted in serial form to receiver circuit 402. For the embodiment of the present invention described herein, each cell of data includes eight bits.

The receiver circuit 402 also includes, for each unit 403, a buffer such as buffer 410. For one embodiment, each of buffers 410, 412, 414, and 416 is a First-In-First-Out (FIFO) buffer. Every clock cycle, eight bits of data sent by a unit 403 arrive to an associated FIFO buffer. However, due to factors that result in misalignment, discussed earlier in this application, data arrives at units 403 at different times. Moreover, units 403 themselves may introduce a delay due to RX latency. Therefore units 403 may send data to the FIFO buffers at different times.

Each stream of serial data arriving at receiver circuit 402 has at its beginning part a character (hereinafter referred to as "SYNC character") indicating that valid data is arriving on a next clock. Once a SYNC character, transmitted through the channel coupled to the first buffer, is detected, alignment control circuit 404 waits for a period of time referred to as "first-time". The first-time has a pre-calculated value that is mostly a function of the characteristics of the channel through which data is transmitted to the last buffer. One of the more influential characteristics of a channel is the length of the trace through which data is transmitted. At or before the first time, the last FIFO buffer receives its first cell of data. After the first time, alignment control circuit 404 asserts a read enable signal, via line 414, to FIFO buffers 410–416. Because the read enable signal is received by FIFO buffers 410–416 at a substantially same time and each FIFO buffer has at least one cell stored therein, cells may be read out of these FIFO buffers substantially simultaneously.

Figure 5:
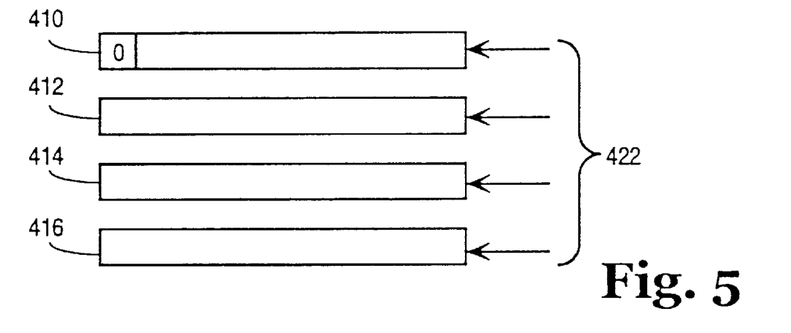
FIGS. 5–8 illustrate FIFO buffers for a receiver circuit according to an embodiment of the present invention.
Figure 6:
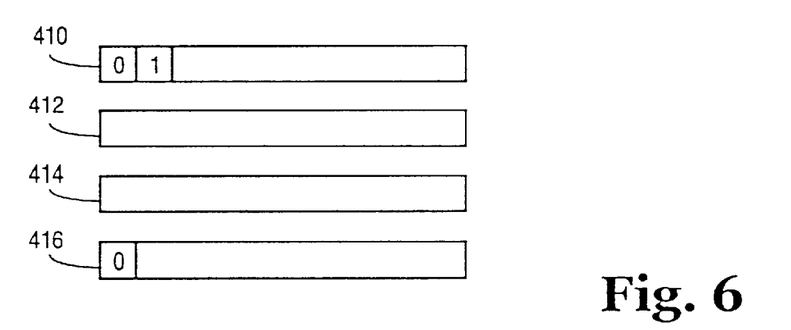
Figure 7:
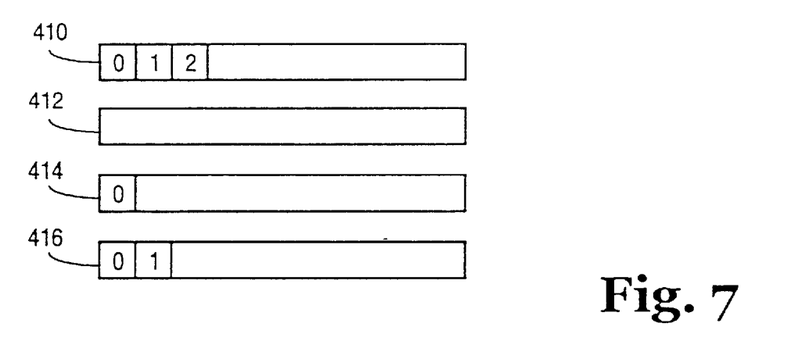

FIGS. 5–8 illustrate FIFO buffers 410, 412, 414, and 416 of FIG. 4 in connection with data received and stored by these FIFO buffers at different times. For purposes of illustration, assume that the four channels, through which data flows to the four FIFO buffers 410–416, cause misalignment in such way that data arrives first to buffer 410, then to buffer 416, then to buffer 414 and last to buffer 412. FIG. 5 illustrates FIFO buffers 410, 412, 414, and 416, where initially FIFO buffer 410 receives and stores a first cell (Cell 0) before the other three FIFO buffers receive any cell of data. On the next clock cycle, FIFO buffer 410 receives and stores cell 1 and FIFO buffer 416 receives and stores its first cell of data—cell 0—as shown in FIG. 6. Two clock cycles after buffer 410 received and stored cell 0, the FIFO buffers store therein data as shown in FIG. 7. FIG. 7 illustrates: (1) FIFO buffer 410 that stores its cells 0, 1, and 2; (2) FIFO buffer 412 that stores no cell; (3) FIFO buffer 414 that stores its cell 0; and (4) FIFO buffer 416 that stores its cells 0 and 1.

Figure 8:
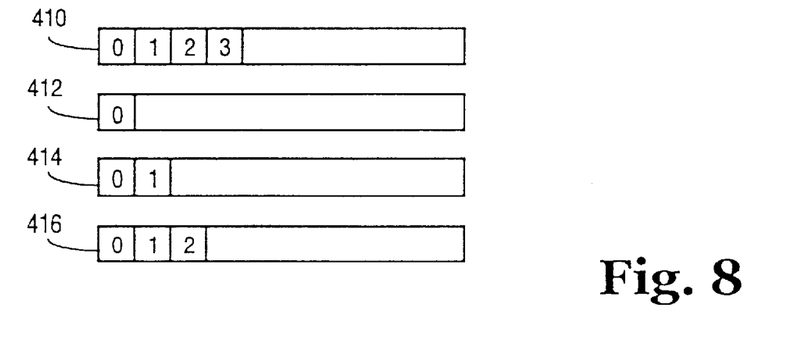

Three clock cycles after buffer 410 received and stored its cell 0, the four FIFO buffers store therein data as illustrated in FIG. 8. Note that FIFO buffer 412, coupled to the "slowest" channel, receives its first cell of data (cell 0) three clock cycles after buffer 410 received its cell 0. Four or more clock cycles after buffer 410 received its cell 0, alignment control circuit 404 of FIG. 4 may assert a read enable signal to the FIFO buffers to cause reading of data from all four FIFO buffers at a substantially same time. At this time, each of the four FIFO buffers contains at least one cell of data. At any time after the first cell of data was received by FIFO buffer 412—i.e., the last FIFO buffer, all FIFO buffers contain data to be read out. From this time on, data may be read out from the four FIFO buffers at a substantially same time.

Figure 9:
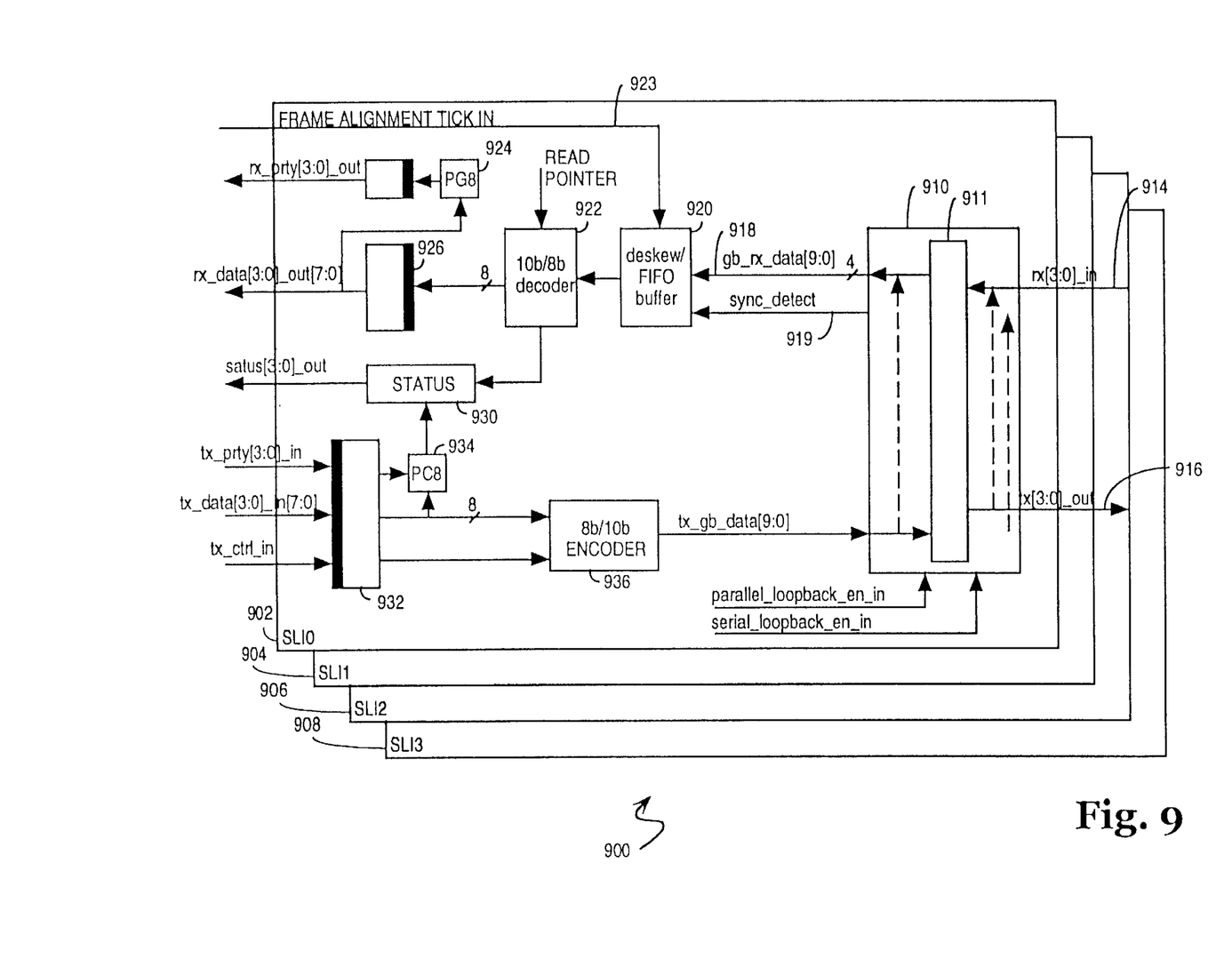
FIG. 9 is a high level block diagram of a serial link interface in connection with a transceiver of an embodiment of a line card according to the present invention.

FIG. 9 illustrates a high level block diagram of a serial link interface 902 located in transceivers of the embodiment illustrated in FIG. 3. Each transceiver is a 8-bit parallel-to-serial and serial-to-parallel quad-transceiver. Each serial link interface runs at a full duplex data rate of 1 Gigabits per second (Gbps), allowing 8 bits to be transmitted at 125 Megahertz. Other serial-link interfaces 904, 906 and 908 are shown in the Figure. The description of serial link interface 902 equally applies to the other serial-link interfaces 904, 906 and 908 because these interfaces have structures substantially identical with the structure of serial-link interface 902.

Serial-link interface 902 includes a serializer/deserializer device 910. For one embodiment, the serializer/deserializer device 910 includes a GigaBlaze Macro device 911 manufactured by LSI Logic Inc. of San Jose, Calif. The GigaBlaze Macro operates at 125 Megahertz on the parallel side and 1.25 Gigahertz on the serial side. Serial-link interface 902 includes circuitry that acts both as a receiver and a transmitter. On the transmit side, an 8-bit word is accepted by an encoder every clock. The 8-bit word is encoded into a 10 bit word and is serially driven-out at approximately 1.25 Gigahertz through four channels 916.

On the receive side, 10 bit encoded words and an associated clock signal are extracted from the serial data stream received through the four channels 914 at approximately 1.25 Gigahertz. The 10-bit word is driven out by GigaBlaze Macro 911 to a FIFO buffer 920. The FIFO buffers in cooperation with an alignment control circuit (not shown in this Figure), align data stored in these buffers to a 125 Megahertz clock. The FIFO buffers compensate for the back plane (chassis) propagation delays among different channels caused by different lengths of traces or for other types of skews due to temperature, cross talk, transceiver latency, etc. The FIFO buffers are large enough to store bits to accommodate for worst case delays between channels when alignment is performed. A global signal Frame_Alignment_Tick_In is driven via line 923 to the FIFO buffers 920 by the alignment control circuit (not shown) to read data from the FIFO buffers once the last FIFO buffer receives at least one cell of data. The Frame_Alignment_Tick_In signal tells the FIFO buffers when to start driving data out.

FIFO buffer 920 is controlled by two pointers—a read pointer and a write pointer. A write pointer is initialized to 0 when a SYNC-DETECT signal transmitted via line 919 is asserted. The SYNC-DETECT signal 919 is asserted when the GigaBlaze Macro 911 detects a SYNC character in the stream of data received. The SYNC character indicates that valid data is arriving on the next clock. A read pointer is initialized to zero when Frame_Alignment_Tick_In is asserted so that data may be read out from the four FIFO buffers at a substantially same time. Data is then passed through decoder 922 and from there to buffer 926. Decoder 922 decodes the 10-bit data to 8 bits. In doing so, it checks to ensure proper data disparity. Bad data disparity indicates that the serial link and/or the GigaBlaze may be bad. Buffer 926 latches the decoded data from block 922. Block 924 is responsible for generating parity on every byte coming out of buffer 926. Serial link interface 902 further includes circuitry, such as 930, 932, 934, 936, related to transmission of data.

Figure 10:
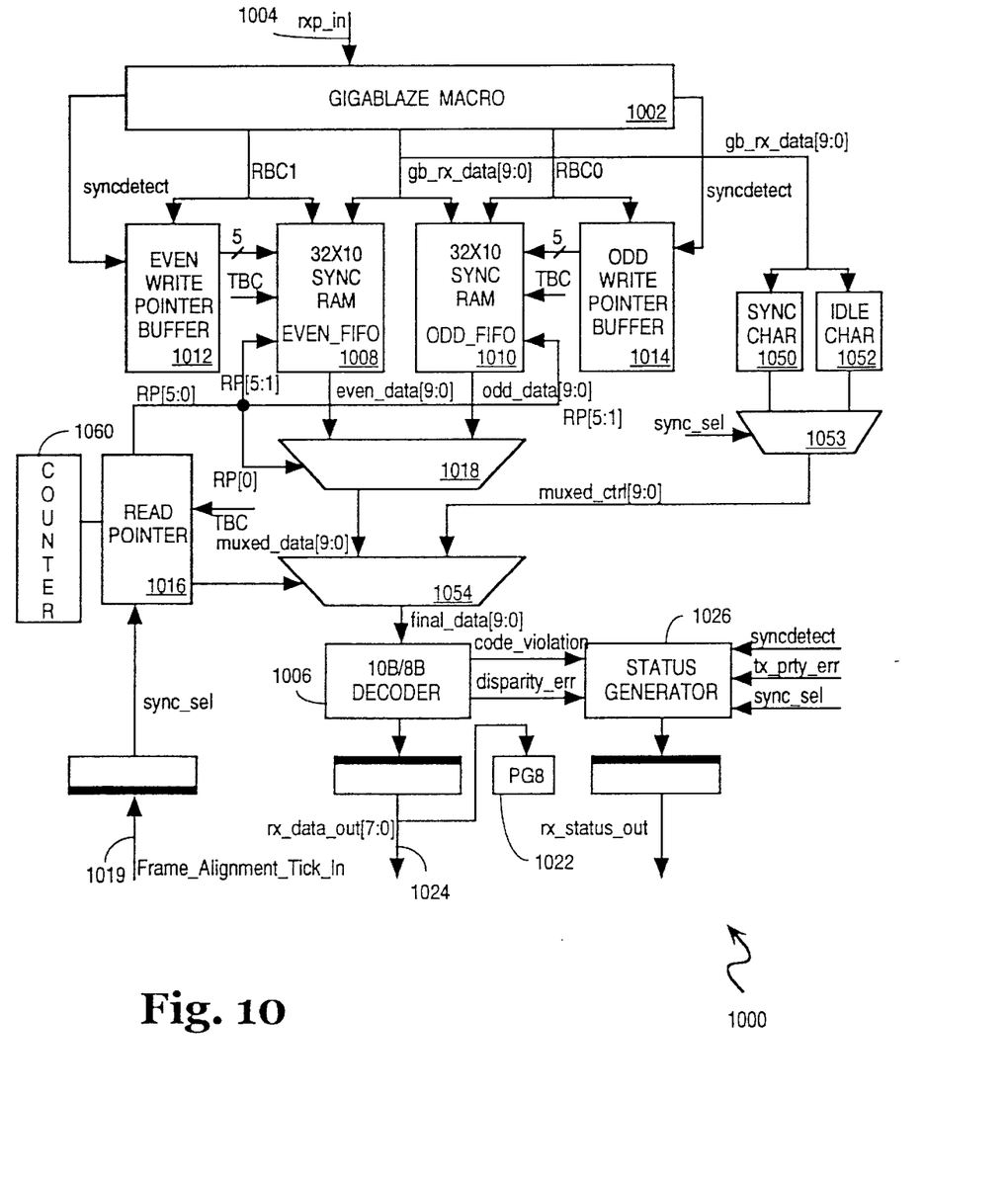
FIG. 10 is a detailed block diagram for an embodiment of a receiver circuit of a line card according to the present invention; and, FIG. 11 is a flow chart for an embodiment of a process for controlling simultaneous reading of data arriving at a destination line card via different channels.

FIG. 10 illustrates a detailed block diagram for an embodiment of a receiver circuit 1000 according to the present invention. Receiver circuit 1000, located in each transceiver of a line card or switch card, includes a Giga-Blaze Macro 1002 that receives data in serial form from line 1004. GigaBlaze Macro 1002 generates two clock signals—clocks RBC0 and RBC1. These clocks are extracted from the received data stream and are 180 degrees out of phase with respect to each other. Each clock RBC0 and RBC1 may be running at approximately 62.5 Megahertz.

For one embodiment, the buffer that stores the received data to be aligned includes two 32×10 synchronous Random Access Memories (RAM) 1008 and 1010. RAM 1008 is labeled in the Figure as "EVEN FIFO", while RAM 1010 is labeled in the figure as "ODD FIFO". The "EVEN" and "ODD" names are established by convention. Two separate write pointers maintained for the EVEN FIFO and ODD FIFO buffers are stored in buffers 1012 and 1014 respectively. The EVEN write pointer is reset when the SYNC character is detected by the GigaBlaze. The ODD write pointer receives the value of the EVEN write pointer on the next rising edge of RBC0.

A read pointer to the EVEN and ODD FIFO buffers, stored in read pointer buffer 1016, is reset to zero one clock after the signal Frame_Alignment_Tick_In is asserted. The first two words may be read out on the next clock. The read pointer may be incremented by a counter 1060. Bit 0 of the read pointer is driven to the select input of multiplexor 1018 to select one of two signals coming from the EVEN and ODD FIFOs 1008 and 1010. The SYNC character is stored in a SYNC character buffer 1050 and an IDLE character is stored in an IDLE character buffer 1052. The IDLE character may be used to make the SYNC character period an even number of clocks. The rest of an incoming frame is alternately written into EVEN and ODD FIFO buffers 1008 and 1010.

Buffers 1050 and 1052 that store the SYNC and IDLE characters, respectively, are multiplexed by multiplexor 1053. Initially, the SYNC character is selected by multiplexor 1053 at the beginning of the frame. The selected character between IDLE and SYNC is multiplexed by multiplexor 1054 with data from FIFO buffers 1008 and 1010. The signal selected at the output of multiplexor 1054 is provided to a 10$b$/8$b$ decoder 1006. The 10$b$/8$b$ decoder descrambles the 10 bit data to 8 bits.

Figure 11:
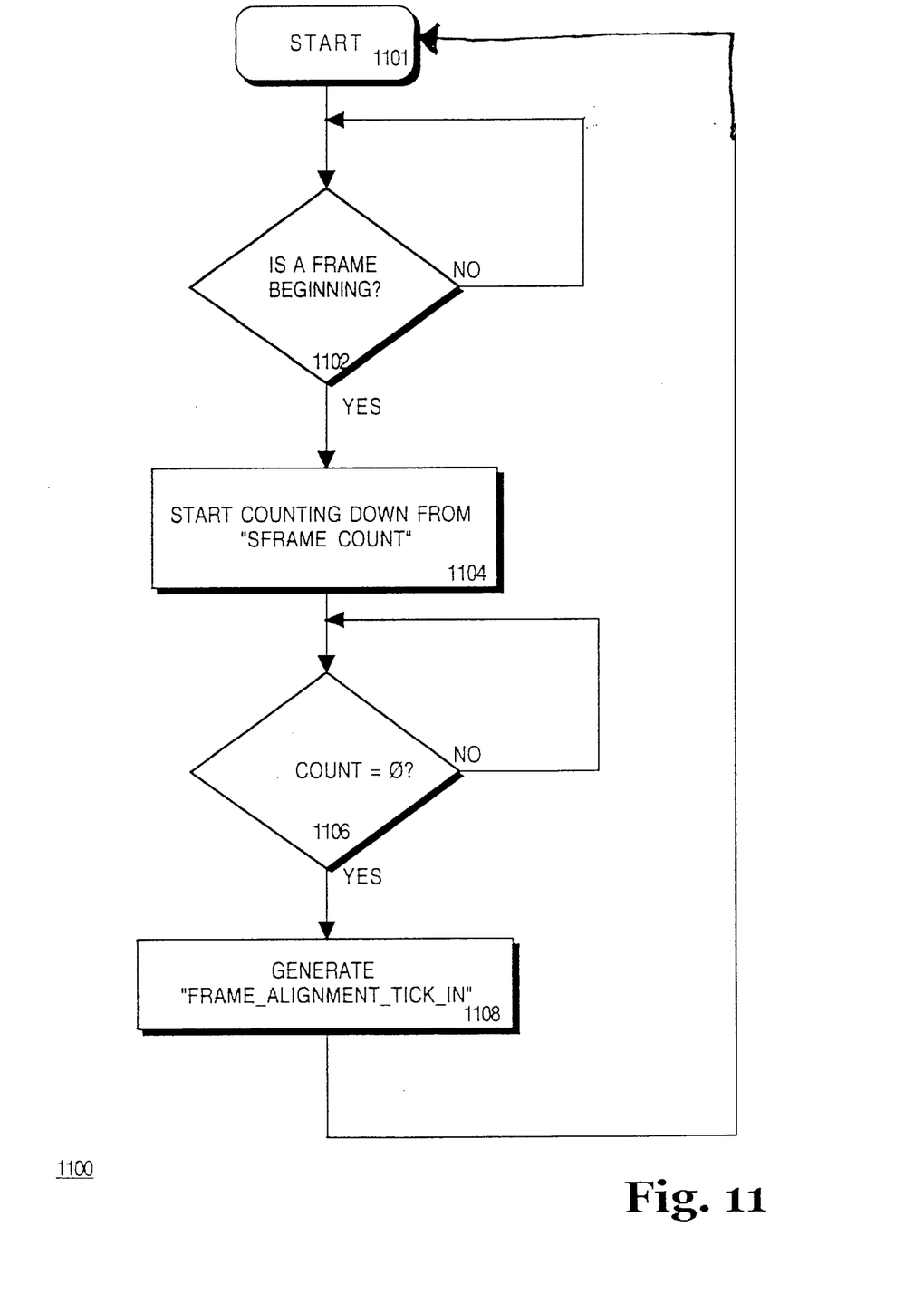

FIG. 11 illustrates a flow chart diagram 1100, for an embodiment of a process for controlling simultaneous reading of data from multiple buffers. Multiple buffers receive data from multiple channels over a communication network. The process starts at block 1101 from where it flows to decision block 1102 where it is determined whether a frame is beginning. For one embodiment, the determination of whether a frame begins is based on examination of whether a signal SFRAME TIC is asserted. This signal is typically asserted after a SYNC character is encountered in the stream of data. If a frame is not beginning, the process loops back to block 1101. If the frame is beginning, the process flows to block 1104 where a lapse of time from the time the SYNC character was encountered is determined. For one embodiment, a counter starts counting down from a value SFRAME COUNT typically stored in the counter. The value SFRAME COUNT is a pre-calculated time value that is calculated as a function of the characteristics of the channels. SFRAME COUNT is calculated mainly as a function of the lengths of traces. SFRAME COUNT is typically equal in value to the "first-time" discussed earlier in this section.

At decision block 1106 it is determined whether the counter finished counting down from SFRAME COUNT. If the counter has counted down to 0, the process flows to block 1108 where the signal Frame_Alignment Tick_In is asserted. On the next clock, after the signal Frame_Alignment_Tick_In is asserted, the first cell is read out from the FIFO buffers and the read pointer of FIG. 10 stored in buffer 1016 is reset to 0.

In the foregoing specification, the invention has been described with reference to exemplary embodiments thereof. It will, however, be evident that various modifications and changes may be made thereto without departing from the broader spirit and scope of the invention as set forth in the appended claims. The specification and drawings are accordingly, to be regarded in a illustrative rather than a restrictive sense.

What is claimed is:

1. A method, comprising:
   receiving information from each of a plurality of serial links;
   storing said information into each of a plurality of First-In-First-Out (FIFO) buffers, each one of said plurality of FIFO buffers reserved for storing received information from a different one of said serial links;
   detecting the arrival, from amongst said plurality of serial links, of a first looked-for synchronization character; and
   removing a unit of data worth of said information from each of said FIFO buffers in response to an amount of time having elapsed since said detecting, said amount of time having been previously calculated, said previous calculation having accounted for trace length differences amongst said serial links.

2. The method of claim 1 further comprising counting a number of clock ticks in order to determine that said amount of time has elapsed.

3. The method of claim 1 further comprising receiving said information from each of a plurality of serial links with a plurality of transceivers, each one of said plurality of transceivers being part of a different one of said serial links, said previous calculation having also accounted for receive latency associated with said plurality of transceivers.

4. The method of claim 3 further comprising transmitting said information, prior to said receiving of said information, over each of a said plurality of serial links with a second plurality of transceivers, each one of said second plurality of transceivers being part of a different one of said serial links, said previous calculation having also accounted for transmit latency associated with said second plurality of transceivers.

5. The method of claim 4 further comprising said previous calculation having also accounted for cross-talk.

6. The method of claim 5 further comprising said previous calculation having also accounted for temperature differences within a system where said method is being executed.

7. The method of claim 1 further comprising said previous calculation having also accounted for cross-talk.

8. The method of claim 1 further comprising said previous calculation having also accounted for temperature differences within a system where said method is being executed.

9. The method of claim 1 further comprising 8B/10B decoding each said unit of data worth of said information after said removing.

10. The method of claim 1 wherein said trace length differences arise from different distances between different cards that are plugged into a chassis.

11. A method, comprising:
    receiving information from each of a plurality of serial links;
    storing said information into each of a plurality of First-In-First-Out (FIFO) buffers, each one of said plurality of FIFO buffers reserved for storing received information from a different one of said serial links;
    detecting the first arrival of a unit of data from amongst said information; and
    removing a unit of data worth of said information from each of said FIFO buffers in response to an amount of time having elapsed since said detecting, said amount of time having been previously calculated, said previous calculation having accounted for trace length differences amongst said serial links.

12. The method of claim 11 further comprising counting a number of clock ticks in order to determine that said amount of time has elapsed.

13. The method of claim 11 further comprising receiving said information from each of a plurality of serial links with a plurality of transceivers, each one of said plurality of transceivers being part of a different one of said serial links, said previous calculation having also accounted for receive latency associated with said plurality of transceivers.

14. The method of claim 13 further comprising transmitting said information, prior to said receiving of said information, over each of a said plurality of serial links with a second plurality of transceivers, each one of said second plurality of transceivers being part of a different one of said serial links, said previous calculation having also accounted for transmit latency associated with said second plurality of transceivers.

15. The method of claim 14 further comprising said previous calculation having also accounted for cross-talk.

16. The method of claim 15 further comprising said previous calculation having also accounted for temperature differences within a system where said method is being executed.

17. The method of claim 11 further comprising said previous calculation having also accounted for cross-talk.

18. The method of claim 11 further comprising said previous calculation having also accounted for temperature differences within a system where said method is being executed.

19. The method of claim 11 further comprising 8B/10B decoding each said unit of data worth of said information after said removing.

20. The method of claim 11 wherein said trace length differences arise from different distances between different cards that are plugged into a chassis.

21. An apparatus, comprising:
a) a plurality of First-In-First-Out (FIFO) buffers, each one of said plurality of FIFO buffers reserved for storing information that was received from a different one of a plurality serial links; and
b) an alignment control circuit that triggers the removal of a unit of data worth of said information from each of said FIFO buffers, said removal being triggered in response to an amount of time having elapsed since the arrival of a first looked-for synchronization character from amongst said plurality of serial links, said amount of time having been previously calculated, said previous calculation having accounted for trace length differences amongst said serial links.

22. The apparatus of claim 21 wherein said alignment control circuit counts a number of clock ticks in order to determine that said amount of time has elapsed.

23. The apparatus of claim 21 further comprising a plurality of transceivers, each of said transceivers being part of a different one of said serial links, said previous calculation having also accounted for receive latency associated with said plurality of transceivers.

24. The apparatus of claim 23 further comprising a second plurality of transceivers that transmit said information to said plurality of transceivers, each one of said second plurality of transceivers being part of a different one of said serial links, said previous calculation having also accounted for transmit latency associated with said second plurality of transceivers.

25. The apparatus of claim 24 further comprising said previous calculation having also accounted for cross-talk.

26. The apparatus of claim 25 further comprising said previous calculation having also accounted for temperature differences within said apparatus.

27. The apparatus of claim 21 further comprising said previous calculation having also accounted for cross-talk.

28. The apparatus of claim 21 further comprising said previous calculation having also accounted for temperature differences within said apparatus.

29. The apparatus of claim 21 further comprising a plurality of 8B/10B decoders that each decode a different one of said units of data worth of said information after said removal.

30. The apparatus of claim 21 wherein said trace length differences arise from different distances between different cards that are plugged into a chassis.

31. An apparatus, comprising:
a) a chassis having a plurality of card slots; and,
b) a card plugged into one of said card slots, said card comprising:
1) a plurality of First-In-First-Out (FIFO) buffers, each one of said plurality of FIFO buffers reserved for storing information that was received from a different one of a plurality of serial links, each one of said serial links to send its information to said card from another card that is plugged into another one of said card slots; and
2) an alignment control circuit that triggers the removal of a unit of data worth of said information from each of said FIFO buffers, said removal being triggered in response to an amount of time having elapsed since the arrival of a first looked-for synchronization character from amongst said plurality of serial links, said amount of time having been previously calculated, said previous calculation having accounted for trace length differences amongst said serial links, said trace length differences arising from different distances between said card slots within said chassis.

32. The apparatus of claim 31 wherein said alignment control circuit counts a number of clock ticks in order to determine that said amount of time has elapsed.

33. The apparatus of claim 31 further comprising a plurality of transceivers, each of said transceivers being part of a different one of said serial links, said previous calculation having also accounted for receive latency associated with said plurality of transceivers.

34. The apparatus of claim 33 further comprising a second plurality of transceivers that transmit said information to said plurality of transceivers, each one of said second plurality of transceivers being part of a different one of said serial links, said previous calculation having also accounted for transmit latency associated with said second plurality of transceivers.

35. The apparatus of claim 34 further comprising said previous calculation having also accounted for cross-talk.

36. The apparatus of claim 35 further comprising said previous calculation having also accounted for temperature differences within said apparatus.

37. The apparatus of claim 31 further comprising said previous calculation having also accounted for cross-talk.

38. The apparatus of claim 31 further comprising said previous calculation having also accounted for temperature differences within said apparatus.

39. The apparatus of claim 31 further comprising a plurality of 8B/10B decoders that each decode a different one of said units of data worth of said information after said removal.

40. An apparatus, comprising:
means for receiving information from each of a plurality of a plurality of serial links;
means for storing said information into each of a plurality of First-In-First-Out (FIFO) buffers, each one of said plurality of FIFO buffers reserved for storing received information from a different one of said serial links;
means for detecting the arrival, from amongst said plurality of serial links, of a first looked-for synchronization character; and means for removing a unit of data worth of said information from each of said FIFO buffers in response to an amount of time having elapsed since said detecting, said amount of time having been previously calculated, said previous calculation having accounted for trace length differences amongst said serial links.

41. The apparatus of claim 40 further comprising means for counting a number of clock ticks in order to determine that said amount of time has elapsed.

42. The apparatus of claim 40 further comprising means for 8B/10B decoding each said unit of data worth of said information after said removing.

43. The apparatus of claim 40 wherein said trace length differences arise from different distances between different cards that are plugged into a chassis.

* * * * *